United States Patent [19]

Tatsushima et al.

[11] Patent Number: 4,871,709

[45] Date of Patent: Oct. 3, 1989

[54] OZONE CRACKING CATALYST

[75] Inventors: Masaru Tatsushima, Isehara; Makoto Sakura, Atsugi, both of Japan

[73] Assignee: Nikki-Universal Co., Ltd., Tokyo, Japan

[21] Appl. No.: 214,178

[22] Filed: Jul. 1, 1988

[30] Foreign Application Priority Data

Jul. 14, 1987 [JP] Japan ................................. 62-176110
Dec. 26, 1987 [JP] Japan ................................. 63-331516

[51] Int. Cl.$^4$ ............................................. B01J 23/34
[52] U.S. Cl. ..................................................... 502/324
[58] Field of Search ................................. 502/241, 324

[56] References Cited

U.S. PATENT DOCUMENTS 3,929,671 12/1975 Nakamura et al. ................. 502/241

FOREIGN PATENT DOCUMENTS 1966535 4/1973 Fed. Rep. of Germany ...... 502/241
2303884 8/1973 Fed. Rep. of Germany .
1425631 2/1976 United Kingdom .
2030053 4/1980 United Kingdom .

OTHER PUBLICATIONS

Above references L and M were provided by applicants.

Primary Examiner—W. J. Shine
Attorney, Agent, or Firm—Flynn, Thiel, Boutell & Tanis

[57] ABSTRACT

This invention relates to an ozone cracking catalyst which comprises active manganese oxide carried on a ceramic fiber aggregate, characterized in that said active manganese oxide is carried on said ceramic fiber aggregate in such a manner as to provide micropores of 100~2000 Å in diameter and in an amount of more than 0.02 cc/g, said ceramic fiber aggregate being composed of walls having vacant pores larger than 5000 Å in diameter and in an amount of more than of 0.1 cc/g.

12 Claims, 11 Drawing Sheets

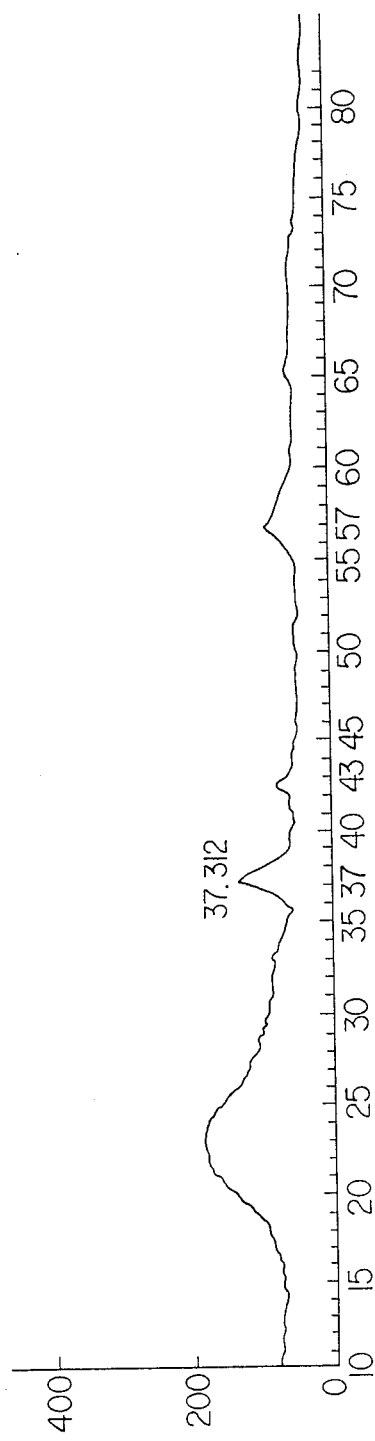
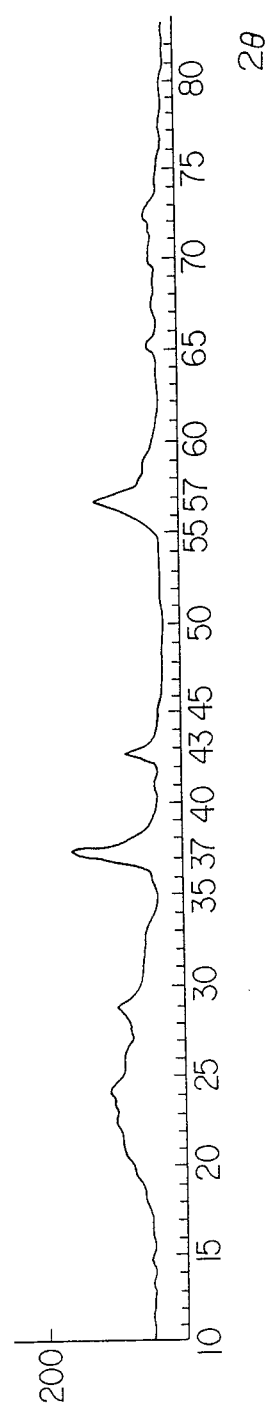
FIG. 3(A)
FIG. 3(B)

OZONE CRACKING CATALYST

BACKGROUND OF THE INVENTION (A) Field of the Invention

This invention relates to a catalyst used for catalytically cracking ozone in an ozone-containing gas, more particularly to an ozone cracking catalyst having active manganese oxide uniformly carried in a large amount, which is excellent in ozone cracking activities and the durability of catalytic activities.

(b) Description of the Prior Arts

Since ozone has a strong oxidizing action, it is widely used for cleaning and sterilizing tap water, treating sewages or factory wastes, denitrating and deodorizing exhaust gases. However, it is normal to use an excess amount of ozone in order to fully conduct the oxidation treatment. Therefore, a superfluous amount of ozone generally remains unreacted.

Ozone is also generated from an electrophotographic copying machine employing a corona discharge system.

As is well known, ozone has a bad influence on a human body, and it is therefore necessary to remove such superfluous ozone by decomposition.

Manganese oxide is conventionally well known as a catalyst for catalytically cracking ozone, and various methods for producing the catalyst have been developed heretofore.

For example, active manganese oxide has been prepared by injecting oxygen or air into an aqueous solution of manganese sulfate in the presence of an equivalent amount of ammonia to oxidize the manganese (see Japanese Patent Laid Open No. 51-4094). It has also been reported to prepare active manganese dioxide by adding potassium permanganate to an acidic aqueous solution of a manganese salt and aging the solution (see Japanese Patent Laid Open No. 51-71299). However, none of these prior catalysts are satisfactory with respect to their catalytic activities and catalyst lives.

Japanese Patent Laid Open No. 58-183928 discloses $\gamma$-MnO$_z$ prepared by three kinds of methods, and it is proposed to form the manganese oxide thus prepared into graanules or a honeycomb structure in combination with an inorganic binder or to form a catalyst coating layer by lining the catalyst on the surface of an apparatus. Also, Japanese Patent Laid Open No. 56-70823 discloses a method for carrying manganese dioxide on a carrier by Wash-coating Method. However, a satisfactory catalyst activity in proportion to the carried amount of manganese dioxide can not be achieved and its catalyst life is also not satisfactory.

Treatment of exhausted ozone is generally accompanied by the treatment of a large amount of gas, and it is therefore necessary to reduce the pressure loss across a catalyst bed. Accordingly, a catalyst supported on a carrier has been widely used heretofore. Japanese Patent Laid Open No. 53-87972 disclosed a method for impregnating active carbon with manganese oxide or previously blending manganese oxide with an active carbon starting material. Japanese Patent Laid Open No. 53-146 88 discloses a method for impregnating particulate alumina with manganese sulfate and thereafter calcining the same. In order to reduce the pressure loss across a catalyst layer, it has also been proposed to coat manganese dioxide on fillers such as Raschig rings and the like (see Japanese Patent Laid Open No. 55-73323) or to coat the surface of a monolith carrier base (see Japanese Patent Laid Open No. 56-166942).

However, any of these conventional methods could not increase an effective catalyst amount, nor could improve a catalyst life.

In order to reduce the pressure loss by a catalyst and to improve the purification rate of exhaust gases, research and development concerning carrier structures supporting a catalyst thereon have progressed remarkably recently. Particularly, a honeycomb structure is known to be an excellent structure since it reduces the pressure loss and enlarges contact area. Heretofore, there are many honeycomb structures formed by extruding ceramics such as cordierite, mullite and the like.

However, conventionally known honeycomb structures prepared by sintering the above mentioned ceramics have disadvantages in that a treating gas generally flows in parallel with the wall of a cell and, consequently, it is hard to secure a large contact area. In order to enlarge the contact area, it is necessary to make the wall of a cell thinner and to increase the number of cells per unit section area, however, such a design leads to weaken the strength of a carrier structure.

SUMMARY OF THE INVENTION

Many of the above-mentioned conventional manganese oxide catalysts have a lower catalytic activity per unit volume. Some of these catalysts have a satisfactory catalytic activity, but their catalyst lives are not always satisfactory.

Also, the effective carried amount of the conventional catalysts is not high enough, and they can not withstand degradation during an ozone cracking reaction. Thus, the conventional catalysts have disadvantages that it is difficult to sufficiently display the inherent catalytic activity of active manganese oxide and that their catalyst lives are short.

Accordingly, an object of the present invention is to provide an ozone cracking catalyst having active manganese oxide carried in a high effective amount, which has a long catalyst life and a stable and high catalytic activity.

As a result of research for achieving the above mentioned object, we have found an ozone cracking catalyst of high activity having a catalyst life much longer than that of conventional catalysts, which does not suffer from degradation during ozone cracking reaction and retains its high activity. The desired catalyst of the present invention can be obtained by having active manganese oxide uniformly dispersed in a carrier in an amount larger than in the case of a vacant pores effective for gas diffusion between carrier fibers, thus enlarging the effective surface area of active manganese oxide.

That is, the above mentioned object of the present invention can be achieved by providing an ozone cracking catalyst which comprises active manganese oxide carried on a ceramic fiber aggregate, characterized in that said active manganese oxide is carried on said ceramic fiber aggregate in an amount of more than 20 g/l (calculated on the basis of Mn) in such a manner so as to provide micropores of 100~2000 Å in diameter and in an amount of more than 0.02 cc/g, said ceramic fiber aggregate bing composed of walls having vacant pores larger than 5000 Å in diameter and in an amount of more than of 0.1 cc/g.

BRIEF DESCRIPTION OF THE DRAWINGS

FIG. 3 (A) shows the X-ray diffraction pattern of Catalyst C of the present invention prepared in Example 3, and FIG. 3 (B) shows the X-ray diffraction pattern of Comparative Catalyst R prepared in Comparative Example 3.

DETAILED EXPLANATION OF THE INVENTION

Figure 1:
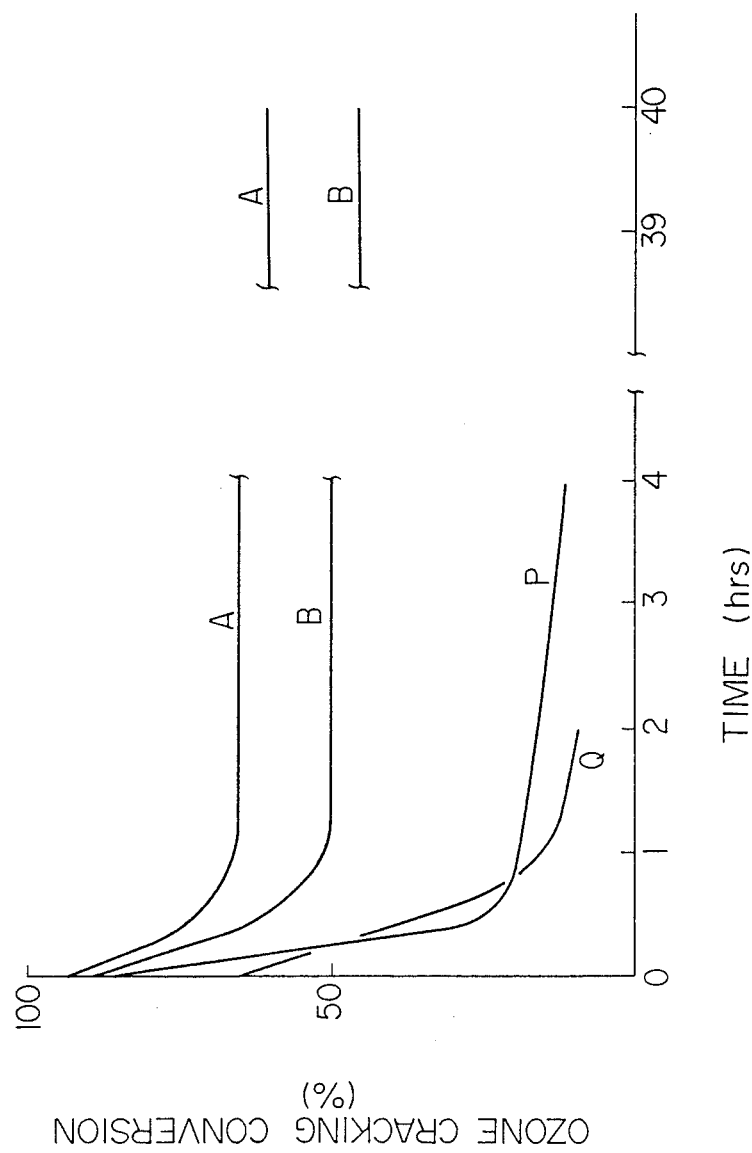
FIG. 1 shows curves illustrating the relationship between operation time and ozone cracking conversion prepared from the results of the activities test of various catalysts carried out under the cracking conditions of ozone disclosed in Example 1. Curve A shows a conversion change with the passage of time with regard to Catalyst A of the present invention prepared in Example 1; Curve B is that of Catalyst B of the present invention prepared in Example 2; Curve P is that of Comparative Catalyst P prepared in Comparative Example 1; and Curve Q is that of Comparative Catalyst Q prepared in Comparative Example 2.

An ozone cracking catalyst of the present invention comprises active manganese oxide carried on an aggregate of ceramic fibers.

The present invention employs an aggregate of ceramic fibers as a carrier, examples of which are disclosed in Japanese Patent Publication No. 59-15028. Said aggregate of ceramic fibers is a sheet-like aggregate of ceramic fibers selected from zirconia fibers, aluminosilicate fibers, alumina fibers, and silica fibers bonded with each other by a silicic acid gel. The wall of the fiber aggregate is characterized by having vacant pores of larger than 5,000 Å in diameter and being composed of spaces between fibers in an amount of more than 0.1 cc/g, preferably more than 0.2 cc/g. The shape of the sheet-like aggregate is not restricted, but any form of the aggregate such as plate-like, wave-like sheets and the like can be employed. Among them, a honeycomb structure prepared by laminating a plate-like sheet with a wave-like sheet is preferable since it reduces the pressure loss during operation and is suitable for treating a large amount of gas.

Microparticles of active manganese oxide are uniformly carried on the above-mentioned carrier in such a manner as not to reduce vacant pores, preferably as to retain vacant pores of larger than 5,000 Å in diameter and in an amount of more than 0.05 cc/g. The particulate manganese oxide is carried on the carrier in an amount of more than 20 g/l, preferably more than 70 g/l, particularly 70~90 g/l, and the manganese oxide thus carried has micropores of 100~2,000 Å in diameter and in an amount of more than 0.02 cc/g, preferably 0.05 cc/g.

A method for preparing an ozone cracking catalyst of the present invention is illustrated hereinafter by the following preparation examples.

(1) Method for Preparing Catalyst Carrying Microparticles of Amorphous Type Active Manganese Oxide An aqueous solution of manganese nitrate [$Mn(NO_3)_2 \cdot 6H_2O$] having a concentration of 10~18% by weight (calculated on the basis of Mn) is prepared. A honeycomb structure carrier comprising a sheet-like aggregate of ceramic fibers having a void percentage of more than 75% and an apparent bulk density (hereinafter referred to as ABD of less than 0.4, preferably 0.28~0.35 (for example, "Honeycle" manufactured by Nichias Corporation) is dipped in the above prepared aqueous solution of manganese nitrate. The dipped honeycomb structure carrier is then removed from the solution, and an excess amount of the solution is blown off from the carrier by air, thus leaving manganese nitrate on the carrier in an amount of more than 20 g/l, preferably 20~90 g/l. The carrier containing manganese nitrate is then maintained in an ammonia gas stream of a high concentration at 20°~40 ° C. for more than 2 hours, thereby neutralizing and aging the manganese nitrate to convert the manganese nitrate into manganese hydroxide.

The catalyst thus obtained is dried in air at a temperature of 130°~150 ° C., and the dried catalyst is thereafter calcined in air at a temperature of 300 ° C. for 2 hours, thus obtaining the desired catalyst containing active manganese oxide.

In the above-mentioned method, the concentration of the ammonia gas used is at least 10% or more, preferably higher than 40%, and the linear velocity (L) of the ammonia gas stream passing through the catalyst is preferably higher than 0.25 m/sec.

According to X-ray diffraction analysis, it was proved that the major part of the active manganese oxide thus obtained comprised microparticles of amorphous manganese oxide. Furthermore, the observation of the catalyst by an optical microscope proved that the active manganese oxide was carried on the ceramic fiber carrier, thereby forming many wrinkles on the surface of the carrier without reducing the surface area thereof. On the other hand, according to the conventional method for carrying an active catalyst component on a carrier, the active catalyst component is carried on the carrier in such a state as to fit between the ceramic fibers like a screen, and thereby remarkably reduce the surface area of the carrier. Thus, the present method does not substantially reduce the surface area of a carrier as compared with the conventional carrying method which does largely reduce the surface area.

(2) Method for Preparing Catalyst Carrying Microparticles of Crystalline Active Manganese Oxide An aqueous solution of manganese nitrate [$Mn(NO_3)_2 \cdot 6H_2O$] having a concentration of 10~18% by weight (calculated on the basis of Mn) is prepared. A honeycomb structure carrier comprising a sheet-like aggregate of ceramic fibers having a void percentage of more than 75% and an ABD of less than 0.5, preferably 0.1~0.4 (for example, "Honeycle" manufactured by Nichias Corporation) is dipped in the above prepared aqueous solution of manganese nitrate. The dipped honeycomb structure carrier is then picked up from the solution, and an excess amount of the solution is blown off the carrier by air, thus carrying manganese nitrate on the carrier in an amount of more than 20 g/l, preferably 20~90 g/l. The carrier containing manganese nitrate is then heated to remove residual water and the water of crystallization by drying, and the dried catalyst is thereafter calcined at a temperature of 200°~400° C. to thermally decompose manganese nitrate into manganese oxide.

According to X-ray diffraction analysis, it was proved that the active manganese oxide thus obtained comprised microparticles of crystalline active manganese oxide. Furthermore, the observation of the catalyst of the present invention by an optical microscope proved that the crystalline active manganese oxide was carried on ceramic fibers of a honeycomb structure in a state of uniform dispersion. On the other hand, according to the conventional method for carrying an active catalyst component on a carrier, the active catalyst component is carried on the carrier in such a state as to fit between the ceramic fibers like a screen (to stretch a screen between fibers so as to cover the whole part of the minute concavo-convex surface of the carrier), thereby remarkably reducing the surface area of the carrier. On the other hand, the present method uniformly disperses crystalline active manganese oxide on a ceramic fiber carrier without blocking and without substantially reducing the surface area of the carrier in comparison with that of the conventional carrying method which largely reduces the surface area of the carrier. In external appearance, the catalyst of the present invention has a blackish color, while the catalyst obtained by the conventional method, for example simply by thermally decomposing manganese nitrate into manganese dioxide, has a silver-grey color.

The pore distributions of the amorphous type and the crystalline type particulate active manganese oxides thus obtained were measured by the mercury penetration method, and it was provided that the active manganese oxides had pores of 100~2,000 Å in diameter and in an amount of more than 0.02 cc/g, preferably more than 0.05 cc/g, the properties of which were different from those of manganese oxide carried by the conventional carrying method.

The measurement of pore distribution by the mercury penetration method was carried out under the conditions of a contact angle of 130° and a surface tension of 474 dyn/cm at a temperature of 25° C. by using a Shimazu Mercury Penetration Porosimeter Model 903-1.

The wall surface of honeycomb structure of each catalyst thus obtained had vacant pores of larger than 5,000 Å in diameter and in an amount of more than 0.1 cc/g, preferably more than 0.2 cc/g, and the retaining of many vacant pores between ceramic fibers in the wall of honeycomb structure enabled the easy gas diffusion into the inside of the carrier wall. Accordingly, the physical properties of the catalyst of the present invention are essentially different from those of conventional catalysts.

The present invention is further illustrated by the following Examples and Comparative Examples concerning the preparation and usage of the inventive catalyst, but should not be limited thereto.

EXAMPLE 1

Preparation of a Catalyst Carrying Amorphous Type Microparticulate Active Manganese Oxide "Honeycle" carrier manufactured by Nichias Corporation (350 cells/square inch, void percentage :80%, and ABD: 0.28) was dipped in an aqueous solution of manganese nitrate [$Mn(NO_3)_2 \cdot 6H_2O$] having a concentration of 18% by weight (calculated on the basis of Mn). The dipped honeycomb structured carrier was then removed from the solution, and an excess amount of the solution was blown off from the carrier by air, thus leaving manganese nitrate on the carrier in an amount of 70 g/l calculated on the basis of Mn). The carrier containing manganese nitrate was then exposed to an ammonia gas stream of 40% (LY: 0.30 m/min, temperature: 30 ° C.) for 2 hours to neutralize and age the manganese nitrate, and the manganese nitrate was thereby converted into manganese hydroxide.

The catalyst thus obtained was dried in air at a temperature of 150 ° C., and the dried catalyst was thereafter calcined in air at a temperature of 300 ° C. for 2 hours. The Catalysts A thus obtained had a block appearance.

Figure 2:
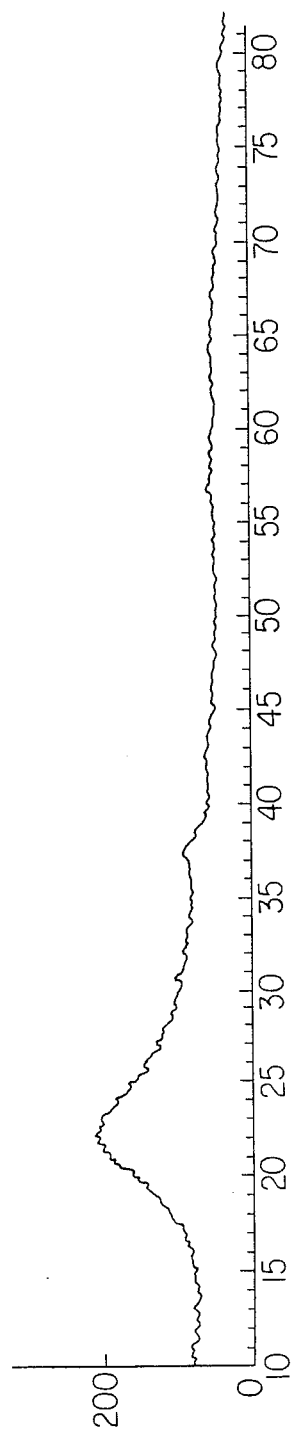
FIG. 2(A) shows the X-rayed diffraction pattern of Catalyst A of the present invention prepared in Example 1, and FIG. 2 (B) shows the X-ray diffraction pattern of Comparative Catallyst P prepared in comparative Example 1.
Figure 2:
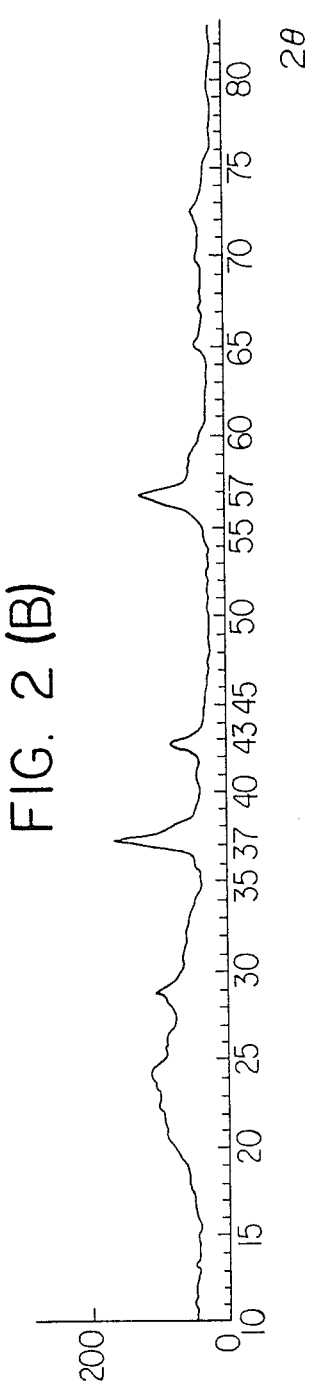

The X-ray diffraction pattern of the active manganese oxide thus obtained is shown in FIG. 2 (A). For reference, the X-ray diffraction pattern of $\beta$-manganese dioxide of Comparative Example 1 is shown in FIG. 2 (B).

The above prepared Catalyst A was tested to evaluate its catalytic performance for cracking ozone under the following cracking conditions:

| | |
|---|---|
| $O_3$ Concentration | 10 ppm |
| Temperature | 21~22° C. |
| Space Velocity (SV) | 180,000/hr |
| Linear Velocity (LV) | 0.5 m/sec |
| Amount of Catalyst (Thickness of Catalyst) | 10 mm/21 mm $\phi$ |

The results concerning the conversion rate of ozone are shown in FIG. 1.

EXAMPLE 2

The same procedure as in Example 1 was repeated to prepare a catalyst, except that Nichias "Honeycle"

having an ABD of 0.38, was dipped in an aqueous solution of manganese nitrate having a concentration of 16% by weight. The catalyst thus prepared (referred to as Catalyst B) was black in external appearance, and carried active manganese oxide in an amount of 42 g/l (calculated on the basis of Mn).

The same test for cracking ozone as in Example 1 was repeated to evaluate the catalytic performance of Catalyst B. The results are shown in FIG. 1. Comparative Example 1.

A comparative catalyst (referred to as Catalyst P) was prepared in the same manner as in Example 1, except that the neutralizing and aging treatment by ammonia gas was not carried out. The comparative Catalyst P thus prepared was silver-grey in external appearance, and carried manganese oxide in an amount of 70 g/l (calculated on the basis of Mn). The manganese oxide thus carried was $\beta$-$MnO_2$.

The catalytic activity of this comparative catalyst was evaluated in the same manner as in Example 1, and the results are shown in FIG. 1. As can be seen from the results, the catalytic activity of the comparative catalyst was remarkably lowered with the passage of time as compared with those of the catalysts of the present invention.

REFERENCE EXAMPLE (This reference example shows that a catalyst itself can have a large surface area without using a carrier if it is prepared by the ammonia injecting method.)

An ammonia gas of a concentration of 40% was injected into an aqueous solution of manganese nitrate having a concentration of 18% by weight as used in Example 1 to thereby form manganese hydroxide. The manganese hydroxide thus formed was dried, and calcined at 300° C. to prepare active manganese oxide having a surface area of 19 m$^2$/g.

On the other hand, a catalyst obtained by drying an aqueous solution of manganese nitrate by evaporation, without injecting ammonia gas and calcining the dried product at a temperature of 300° C., was $\beta$-$MnO_2$ having a surface area of 0.7 m$^2$/g.

COMPARATIVE EXAMPLE 2

A slurry of the active manganese oxide prepared in the above Reference Example was wash-coated five times on Nichias "Honeycle" carrier as used in Example 1 to thereby produce comparative Catalyst Q carrying active manganese oxide in an amount of 50 g/l (calculated on the basis of Mn).

The catalytic performance of this comparative Catalyst Q was evaluated in the same manner as above, and the results are shown in FIG. 1. As can be seen from FIG. 1, the catalyst prepared by the "wash-coating" method does not achieve the desired effect of the present invention.

EXAMPLE 3

Preparation of Catalyst Carrying Crystalline Type Microparticulate Active Manganese Oxide "Honeycle" carrier manufactured by Nichias Corporation (205 cells/square inch, porosity: 80%, and ABD: 0.20 g/cm$^3$) was dipped in an aqueous solution of manganese nitrate [$Mn(NO_3)_2 \cdot 6H_2O$] having a concentration of 15.8% by weight (calculated on the basis of Mn). The dipped honeycomb structured carrier was then removed from the solution, and an excess amount of the solution was blown off from the carrier by air, thus leaving manganese nitrate on the carrier in an amount of 60 g/l (calculated on the basis of Mn). The carrier containing manganese nitrate was then carefully dried in heated air to fully remove residual water and the water of crystallization, and the dried product was thereafter calcined at a temperature of 200~400° C. to convert manganese nitrate into crystalline active manganese oxide having a black appearance. Thus, Catalyst C was prepared.

The X-ray diffraction pattern of the active manganese oxide thus produced is shown in FIG. 3 (A). Comparative Example 3.

Manganese nitrate was carried on a carrier in the same manner as in Example 3. The resulting carrier was directly calcined at a temperature of 300° C. in a muffle furnace without specifically removing the residual water and water of crystallization by drying. The Catalyst R thus obtained had a silver-grey appearance.

As can be seen from the diffraction pattern in FIG. 3 (B), manganese oxide in Catalyst R was a crystal of $\beta$-$MnO_2$. The $\beta$-$MnO_2$ thus obtained had a surface area much smaller than that of Catalyst C, and was disposed on a carrier in such a manner as to fit between the ceramic fibers of the carrier like a screen and to thereby considerably reduce the air-permeability of the carrier. Accordingly, the catalytic activity of Catalyst R was also degraded.

The above obtained catalyst R was tested to evaluate its catalytic performance for cracking ozone under the following cracking conditions:

| | |
|---|---|
| $O_3$ Concentration | 10 ppm |
| Temperature | 3° C. |
| Space Velocity (SV) | 45,000/hr |
| Linear Velocity (LV) | 0.5 m/sec |
| Amount of Catalyst (Thickness of Catalyst) | 40 mm/21 mm $\phi$ |

Figure 4:
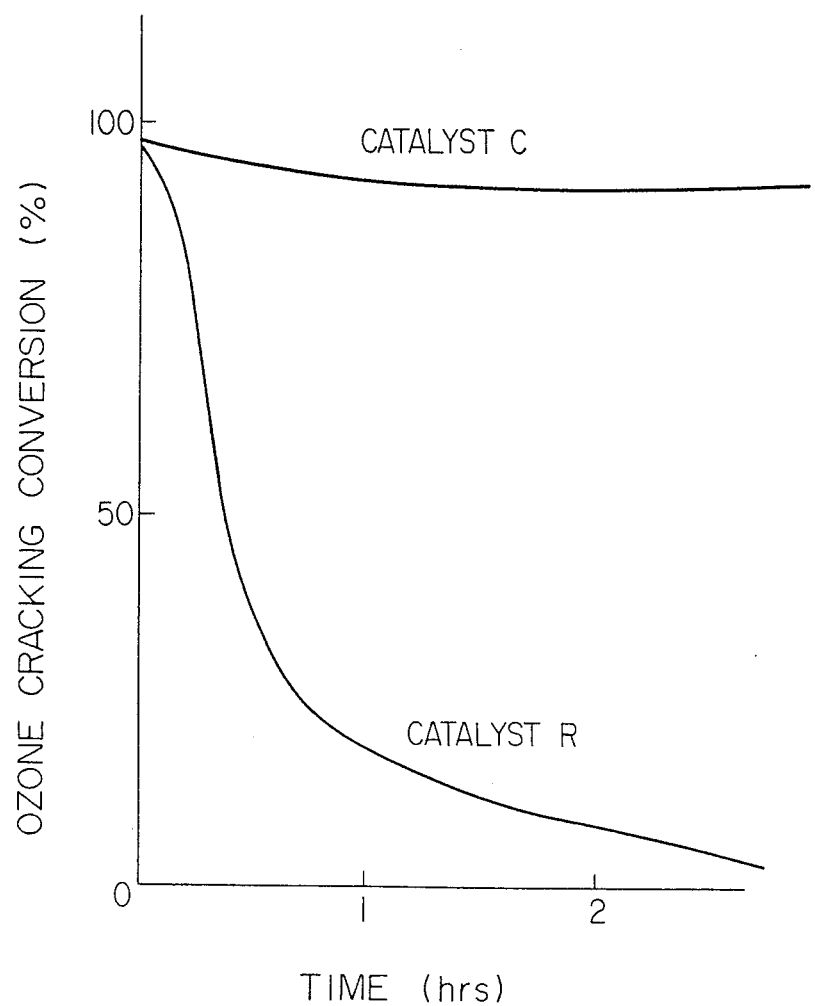
FIG. 4 shows curves illustrating the conversion change with the passage of time with regard to Catalyst C prepared in Example 3 and that of Comparative Catalyst R prepared in Comparative Example 3.

The results concerning the conversion rates of ozone are shown in FIG. 4.

The crystal size of the above prepared catalyst was calculated from the diffraction pattern in accordance with the following Scherrer's empirical formula.

$$\text{Crystal Size (Å)} = \frac{\lambda}{\beta \cdot \cos \theta}$$

$\lambda$: Wavelength of K $\alpha$ ray of Cu as X-ray=1.54178 Å.

$\delta$: Radian of diffraction ray according to the size of crystal

7$\theta$: Bragg angle (degree) (2$\theta \approx$ 37.3°)

The above prepared Catalyst C of black appearance comprised a carrier having crystalline active manganese oxide uniformly dispersed thereon in a large amount, the crystal size of which was about 58 Å.

Figure 5:
FIG. 5 is an electromicroscopic photograph showing the surface state of Catalyst C of the present invention prepared in Example 3.
Figure 6:
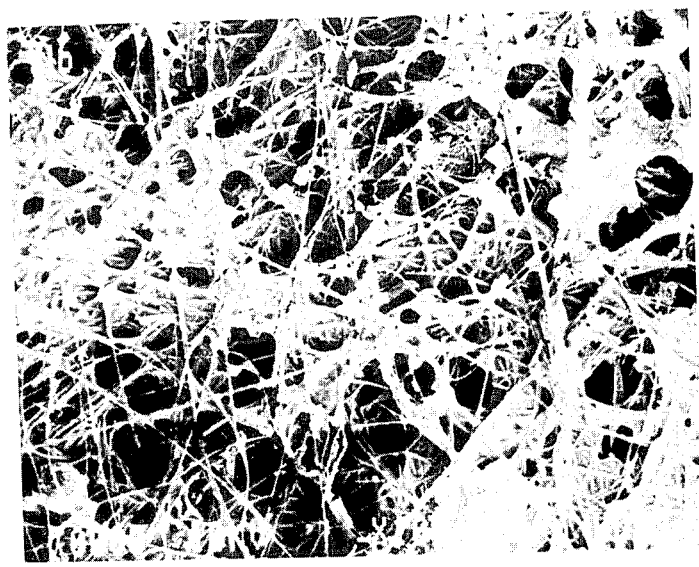
FIG. 6 shows the surface state of Comparative Catalyst R prepared in Comparative Example 3.

FIG. 5 is an electromicroscopic photograph showing the state of the catalyst surface of Catalyst C of Example 3, and FIG. 6 is that showing the surface state of Catalyst R of Comparative Example 3. These photographs were taken by using a JSM-840 Type Scanning electron microscope, manufactured by Nihon Denshi Co., Ltd., under the conditions of an acceleration voltage of 10 KV and a probe electric current of 6×10$^{-10}$ A.

These electromicroscopic photographs clearly show the surface difference between both catalysts, and prove the external color difference between the two.

ANALYSIS OF EXAMPLE 1

Figure 7:
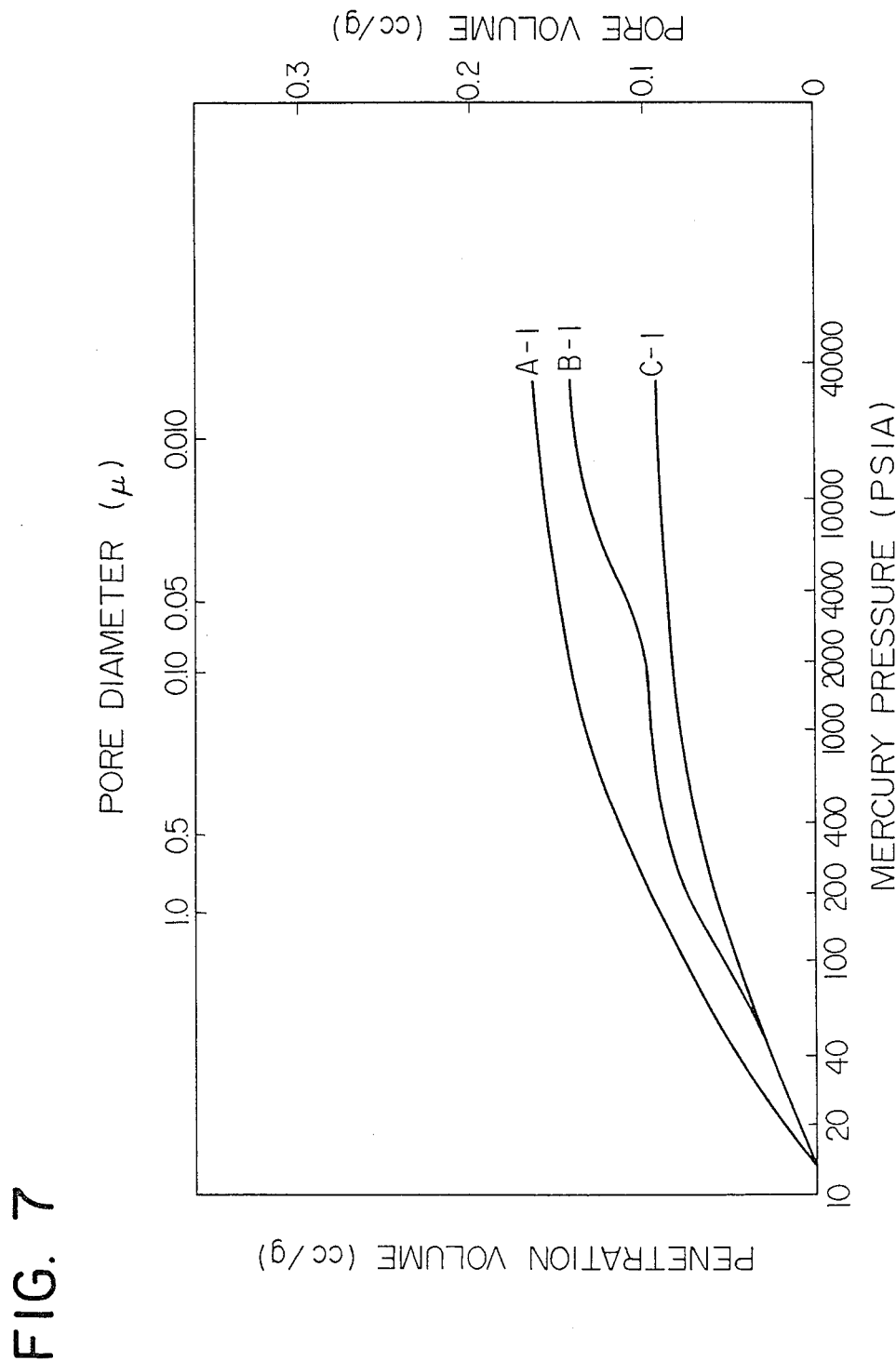
FIG. 7 shows mercury penetration curves of ozone cracking catalysts, wherein Curve A-1 is the mercury penetration curve of a carrier having an apparent bulk density (ABD) of 0.43 g/cc; Curve B-1 is the mercury penetration curve of the catalyst of the present invention having manganese oxide carried on said carrier A-1 in an amount of 53 g/l (calculated on the basis of Mn) prepared in Example 1; and Curve C-1 is the mercury penetration curve of the comparative catalyst using said carrier A-1 prepared in Comparative Example 1.
Figure 8:
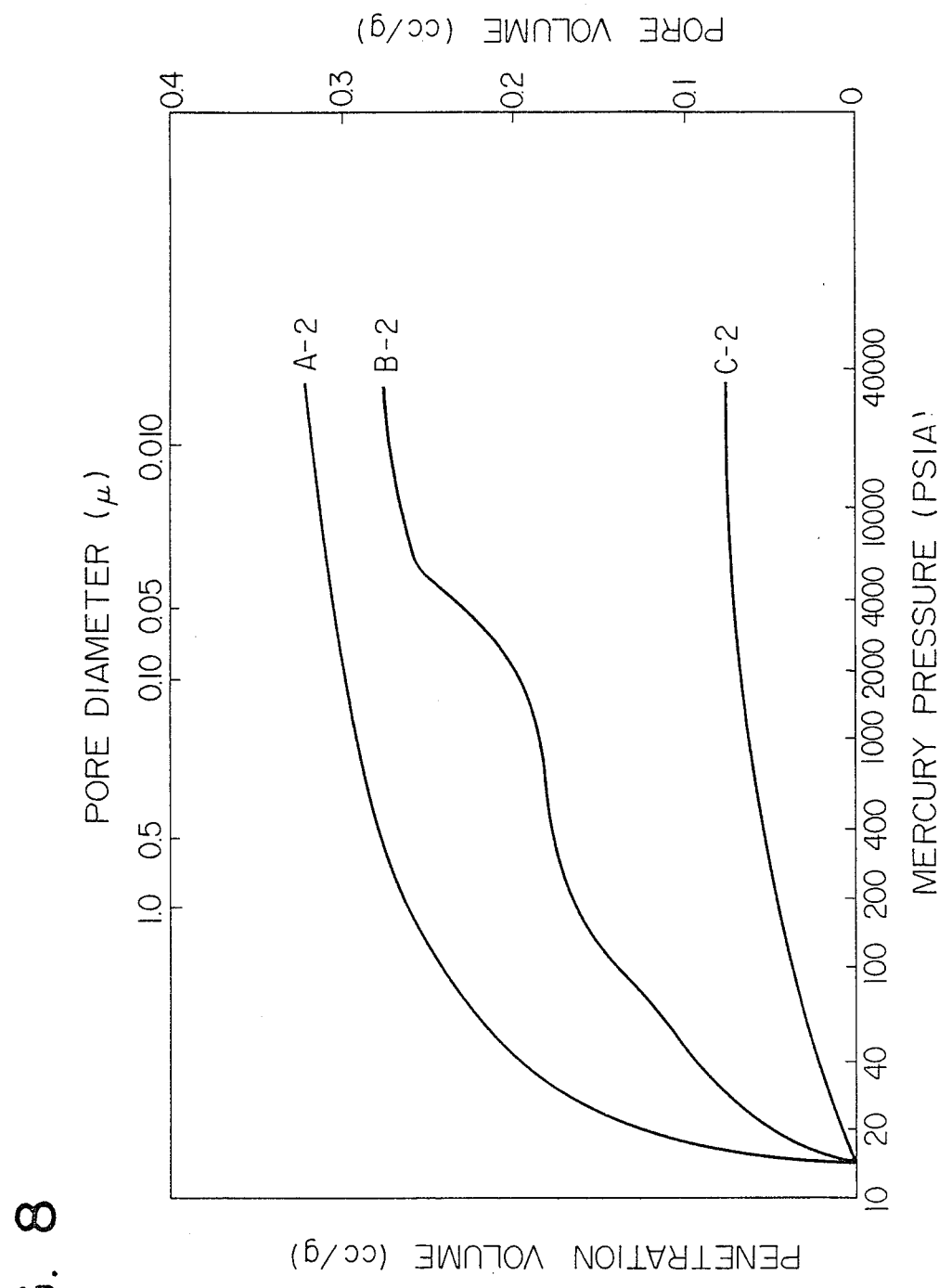
FIG. 8 also shows mercury penetration curves of ozone cracking catalysts, wherein Curve A-2 is the mercury penetration curve of an ABD of 0.28 g/cc; Curve B-2 is the mercury penetration curve of the catalyst of the present invention having manganese oxide carried on said carrier A-2 in an amount of 74 g/l (calculated on the basis of Mn) prepared in Example 3; and curve C-2 is the mercury penetration curve of a comparative catalyst using said carrier A-2 prepared in Comparative Example 3.

Pore distributions of both amorphous type and crystalline type particulate active manganese oxide-containing catalysts were measured by the mercury penetration method using a Shimazu Mercury Penetration Porosimeter Model 903-1 under a contact angle of 130° and a surface tension of 474 dyn/cm at a temperature of 25° C. The results are shown in FIGS. 7 and 8. In these figures, the ordinate shows pore volume (cc/g), the lower abscissa shows mercury pressure (PSIA) and the upper abscissa shows pore size in diameter ($\mu$).

Curve A-1 shows the pore distribution of a carrier having an ABD of 0.43 g/cc; Curve A-2 shows the pore distribution of a carrier having an ABD of 0.28 g/cc; Curve B-1 shows the pore distribution of a catalyst carrying manganese oxide on the carrier having an ABD of 0.43 g/cc in an amount of 53 g/l (calculated on the basis of Mn) prepared in Example 1; Curve B-2 shows the pore distribution of a catalyst carrying manganese oxide on the carrier having an ABD of 0.28 g/cc in an amount of 74 g/l (calculated on the basis of Mn) prepared in Example 3; Curve C-1 shows the pore distribution of a catalyst carrying manganese oxide on the carrier having an ABD of 0.43 g/cc prepared in Comparative Example 1; and Curve C-2 shows the pore distribution of a catalyst carrying manganese oxide on the carrier having an ABD of 0.28 g/cc prepared in Comparative Example 3.

FIG. 7 shows examples of using a heavy carrier having a high ABD value, the wall of which has vacant pores in a small amount, thus the amount of catalyst carried thereon being small. FIG. 8 shows examples of using a light carrier having a low ABD value, the wall of which has vacant pores in a large amount, thus the amount of catalyst carried thereon being large.

The strength of a carrier of lower ABD is generally low. However, the manganese oxide in the catalyst of the present invention acts also as a binder and is carried on the carrier in a very large amount. Therefore, the strength of the carrier itself is reinforced by the active manganese oxide carried thereon. Accordingly, a highly porous carrier, which could not be used by a conventional method, can be favourably used in the present invention.

As can be seen from FIGS. 7 and 8, in the case of conventional catalysts, as illustrated by comparative examples, most vacant pores between the fibers which are effective for gas diffusion in the wall of a carrier, expressed by a mercury pressure of 10–200 PSIA, are plugged. On the other hand, these figures prove that the catalysts of the present invention retain vacant pores having a diameter of more than 5,000 Å and in an amount of more than 0.05 cc/g, preferably more than 0.09 cc/g.

Figure 9:
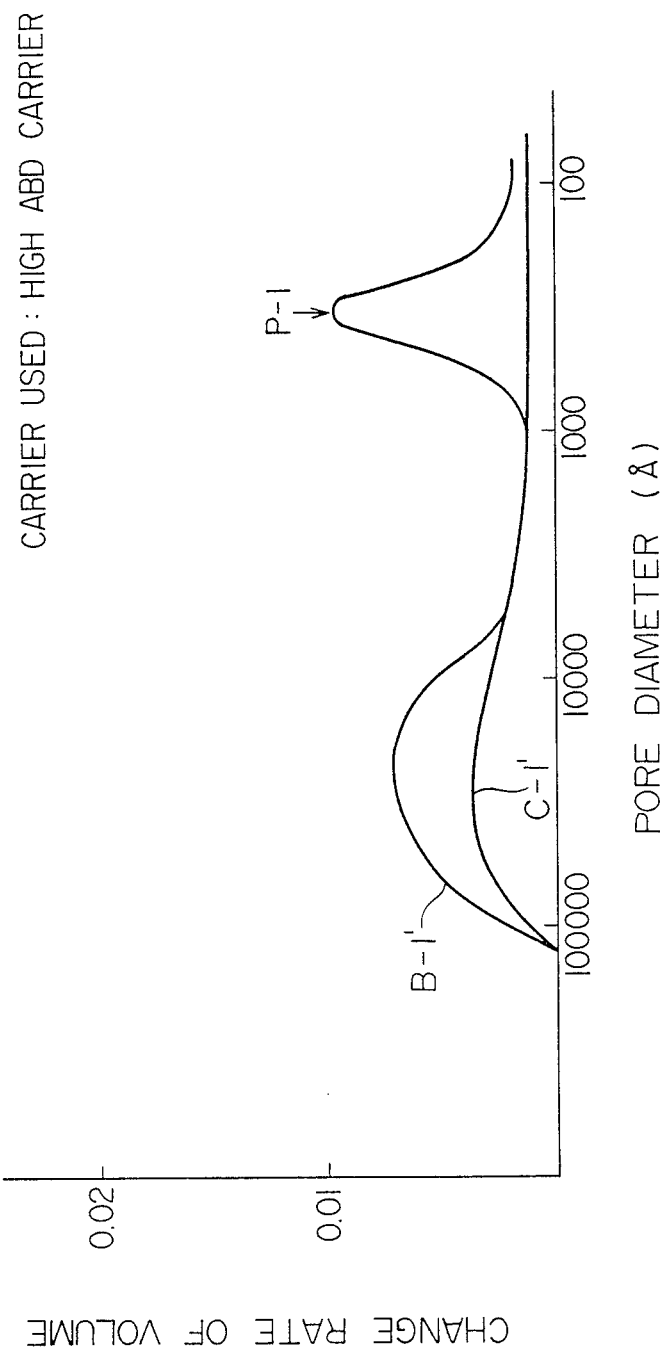
FIGS. 9 and 10 are graphs illustrating pore distributions of ozone cracking catalysts.
Figure 10:
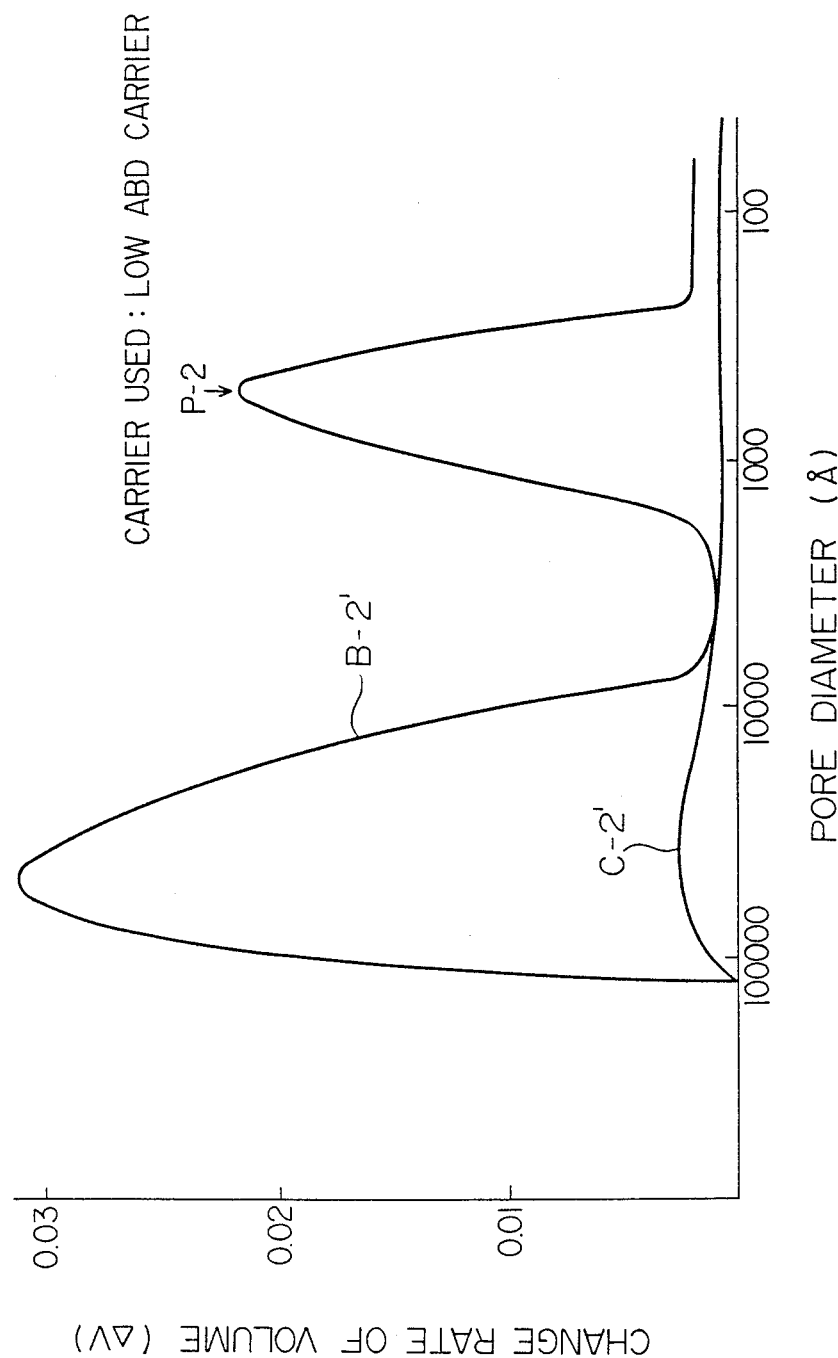

The pore distribution curves of the catalysts of the present invention shown in FIGS. 9 and 10 have peaks P-1 and P-2 in the zone of a mercury pressure of higher than 2,000 PSIA, and these peaks P-1 and P-2 indicate the presence of pores formed by $MnO_2$ itself. The pore distribution curves of conventional catalysts prepared in the comparative examples do not have such peaks, and this means that pores formed by $MnO_2$ itself are not present.

The pore distribution curves in FIGS. 9 and 10 were prepared by differentially analyzing mercury injection curves shown in FIGS. 7 and 8 respectively. In FIGS. 9 and 10, the ordinate shows the exchange rate of volume ($\Delta V$) and the abscissa shows pore diameter (Å). Curves B-1', C-1', B-2' and C-2' respectively correspond to curves B-1, C-1, B-2 and C-2 in FIGS. 7 and 8.

The catalytic performance of the catalyst of the present invention (ABD=0.35 g/cc, amount of manganese oxide calculated on the basis of Mn=65 g/l) was tested to evaluate its recovering performance of catalytic activity by intermittently using the catalyst under the following ozone cracking conditions:

| | |
|---|---|
| $O_3$ Concentration | 10 ppm |
| Temperature | 25° C. |
| Space Velocity (SV) | 90,000/hr |
| Linear Velocity (LV) | 0.5 m/sec |
| Amount of Catalyst (Thickness of Catalyst) | 20 mm/21 mm $\phi$ |

Figure 11:
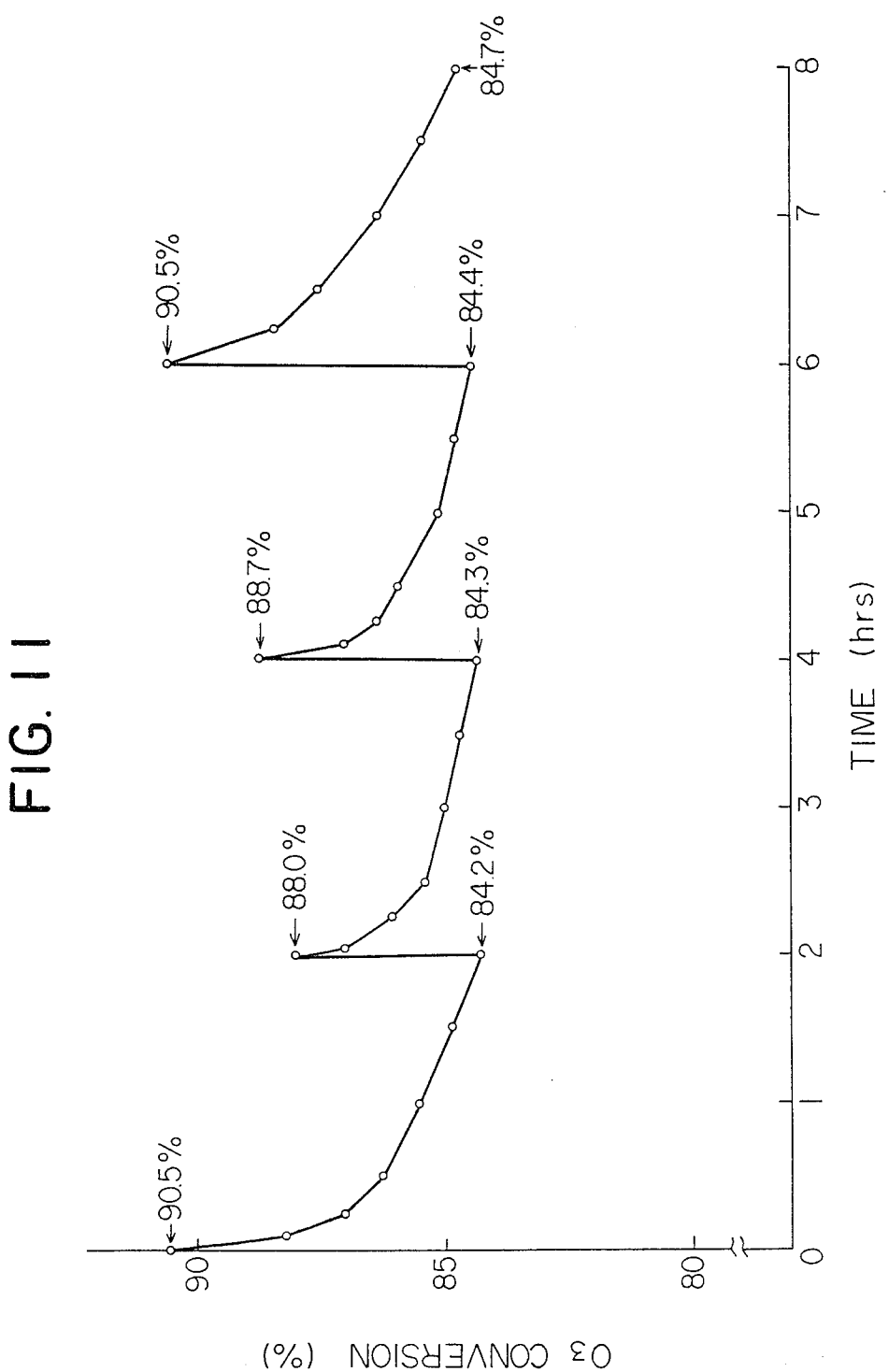
FIG. 11 shows the conversion change with the passage of time with regard to the catalyst of the present invention having an ABD of 0.35 g/cc and containing manganese oxide in an amount of 65 g/l (calculated on the basis of Mn) which was discontinuously used for cracking ozone.
Figure 12:
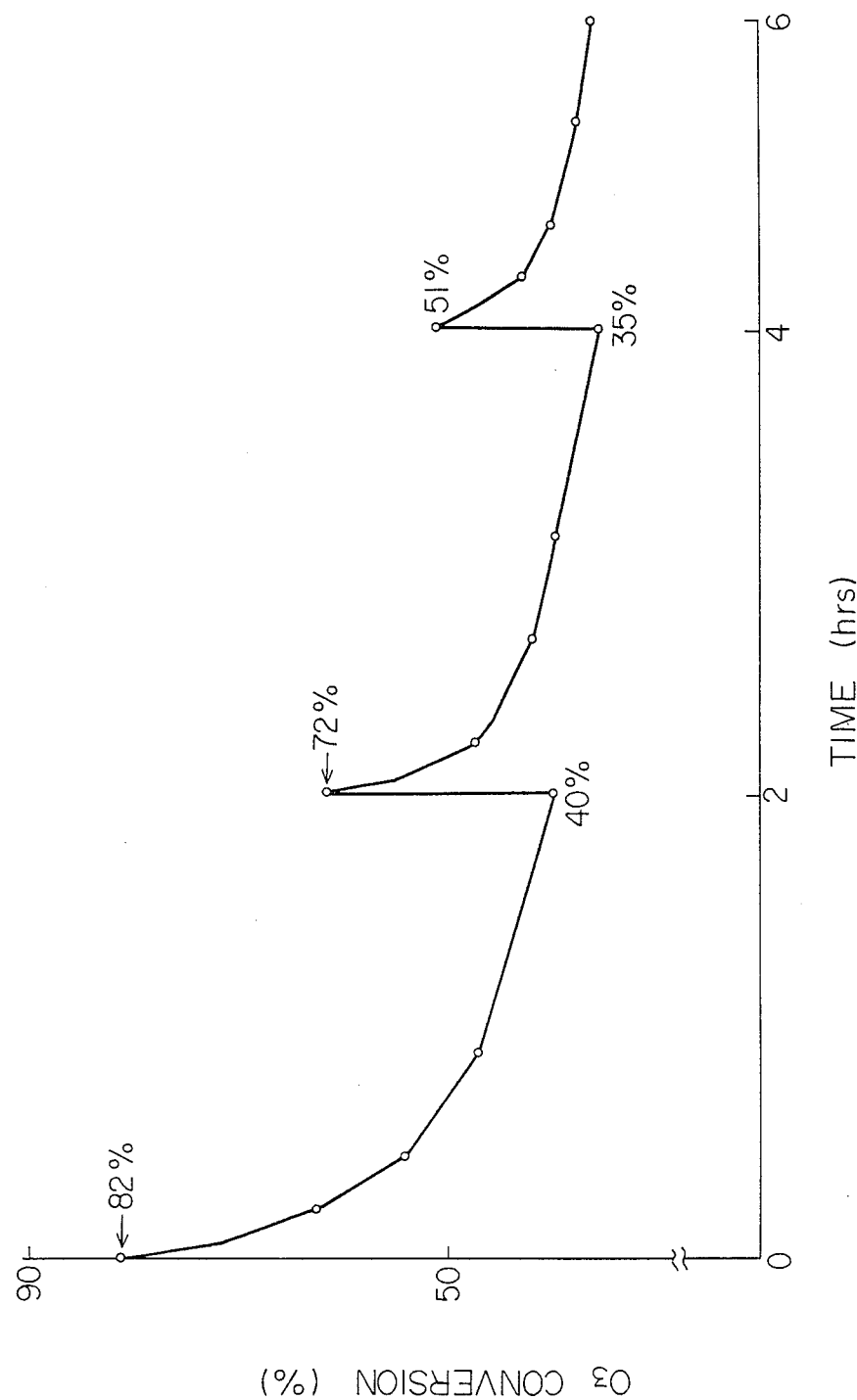
FIG. 12 shows the conversion change with the passage of time with regard to the comparative catalyst prepared in the same manner as in Comparative Example 3 which was discontinuously used for cracking ozone.

The results are shown in FIGS. 11 and 12.

FIGS. 1 and 4 show the catalytic performance of the present invention when used continuously, and prove that the catalyst of the present invention has excellent catalytic activity, and a stable and long catalyst life, during which the catalytic activity is less degraded, as compared with conventional catalyst.

Furthermore, as can be seen from FIGS. 11 and 12, the catalyst of the present invention recovers its catalytic activity more satisfactorily during the suspension of operation in comparison with conventional catalyst. This is a miraculous effect.

FIG. 11 shows the results of an ozone cracking reaction carried out for 2 hours under the above mentioned conditions using the catalyst of the present invention. The initial conversion rate was 90.5%, and it was lowered to 84.2%. At this point, the ozone gas stream was stopped, and the operation was suspended for 1 hour at 25 ° C. During this suspension, the conversion rate of the catalyst recovered to 88.0%. The ozone cracking reaction was repeated for 2 hours in the same manner as above and the conversion rate lowered to 84.3%. The operation was suspended for 2 hours at 25° C. in the same manner as above, during which the conversion rate recovered to 88.7%. The ozone cracking reaction was further repeated for 2 hours under the same conditions as above and the conversion rate lowered to 84.4%. At this point, the ozone gas stream was stopped, and the operation was suspended for 15 hours at 25° C. The conversion rate rose to 90.5%. This means that the conversion rate was raised to the initial conversion rate. This is quite a satisfactory recovery property.

FIG. 12 shows the results of an ozone cracking reaction conducted by using a comparative silver-grey catalyst having a catalyst thickness of 20 mm/21 mm $\phi$ as prepared in Comparative Example 3. The ozone cracking reaction was conducted in the same manner as shown in FIG. 11, except that the operation was suspended twice by allowing the catalyst to stand for one day in air. The comparative catalyst also recovered its catalytic activity to some extent, but the extent of recovery is very small.

As mentioned above, the catalyst of the present invention carries microparticles of active manganese oxide uniformly dispersed in the inside of the carrier wall in a large amount without losing favourable air-permeability of the carrier by making efficient use of the air-permeability and effective surface area of the carrier which comprises an aggregate of ceramic fibers, and thereby provides excellent catalytic activity and a long catalyst life during which the catalytic activity is less degraded. Moreover, the catalyst of the present invention has a miraculous recovering power of catalytic activity when used intermittently.

What we claim is:

1. An ozone cracking catalyst which comprises active manganese oxide carried on a ceramic fiber aggregate, characterized in that said active manganese oxide is carried on said ceramic fiber aggregate in such a manner as to provide micropores of 100~2000 Å in diameter and in an amount of more than 0.02 cc/g, said ceramic fiber aggregate being composed of walls having vacant pores larger than 5000 Å in diameter and in an amount of more than of 0.1 cc/g.

2. The ozone cracking catalyst as claimed in claim 1, wherein said active manganese oxide is carried on said ceramic fiber aggregate in an amount of more than 20 g/l calculated on the basis of Mn.

3. The ozone cracking catalyst as claimed in claim 1, wherein said ceramic fiber aggregate is composed of walls having vacant pores larger than 5000 Å in diameter and in an amount of more than of 0.2 cc/g.

4. The ozone cracking catalyst as claimed in claim 1, wherein said active manganese oxide is carried on said ceramic fiber aggregate in such a manner as to provide micropores of 100~2000 Å in diameter and in an amount of more than 0.05 cc/g.

5. The ozone cracking catalyst as claimed in claim 1, wherein said ceramic fiber aggregate has a honeycomb structure comprising sheet-like aggregates of ceramic fiber.

6. The ozone cracking catalyst as claimed in claim 1, wherein the major part of said active manganese oxide comprises microparticulate amorphous manganese oxide.

7. The ozone cracking catalyst as claimed in claim 1, wherein the major part of said active manganese oxide comprises microparticulate crystalline manganese oxide.

8. The ozone cracking catalyst as claimed in claim 1, wherein said ozone cracking catalyst is prepared by the steps comprising: (1) dipping a carrier into an aqueous solution of manganese nitrate to form a carrier containing manganese nitrate; (2) removing excess manganese nitrate from said carrier; (3) contacting said carrier with an ammonia gas stream to convert the manganese nitirate into manganese hydroxid; (4) drying the carrier; riser; and (5) calcining the carrier to obtain a catalyst containing active manganese oxide, wherein the major part of said active manganese oxide comprises microparticulate, amorphous manganese oxide.

9. The ozone cracking catalyst as claimed in claim 1, wherein said ozone cracking catalyst is prepared by the steps comprising: (1) dipping a carrier into an aqueous solution of manganese nitrate to form a carrier containing manganese nitrate; (2) removing excess manganese nitrate from said carrier; (3) heating the carrier to completely remove residual water and water of crystallization; and (4) calcining the carrier to obtain a catalyst containing active manganese oxide, wherein the major part of said active manganese oxide comprises a crystalline-type, microparticulate manganese oxide.

10. An ozone cracking catalyst which comprises active manganese oxide carried on a ceramic fiber aggregate, characterized in that said ceramic fiber aggregate has a honeycomb structure comprising sheet-like aggregates of ceramic fiber and is composed of walls having vacant pores larger than 5000 Å in diameter and in an amount of more than 0.2 cc/g, said active manganese oxide being carried on said ceramic fiber aggregate in an amount of more than 20 g/l, calculated on the basis of Mn, and in such a manner as to provide micropores of 100~2000 Å in diameter and in an amount of more than 0.05 cc/g, the major part of said active manganese oxide comprising microparticulate manganese oxide.

11. The ozone cracking catalyst as claimed in claim 10, wherein said ozone cracking catalyst is prepared by the steps comprising: (1) dipping a carrier into an aqueous solution of manganese nitrate to form a carrier containing manganese nitrate; (2) removing excess manganese nitrate from said carrier; (3) contacting said carrier with an ammonia gas stream to convert the manganese nitrate to manganese hydroxide; (4) drying the carrier; and (5) calcining the carrier to obtain a catalyst containing active manganese oxide, wherein said major part is a micro-particulate; amorphous manganese oxide.

12. The ozone cracking catalyst as claimed in claim 10, wherein said ozone cracking catalyst is prepared by the steps comprising: (1) dipping a carrier into an aqueous solution of manganese nitrate to form a carrier containing manganese nitrate; (2) removing excess manganese nitrate from said carrier; (3) heating the carrier to remove residual water and water of crystallization; and (4) calcining the carrier to obtain a catalyst containing active manganese oxide, wherein said major part is a crystalline-type, microparticulate manganese oxide.

* * * * *

UNITED STATES PATENT AND TRADEMARK OFFICE
CERTIFICATE OF CORRECTION

PATENT NO. : 4 871 709

DATED : October 3, 1989

INVENTOR(S) : Masaru TATSUSHIMA et al

It is certified that error appears in the above-identified patent and that said Letters Patent is hereby corrected as shown below:

Column 11, line 47; delete "riser;".

Signed and Sealed this

Twenty-sixth Day of February, 1991

*Attest:*

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,871,709

DATED : October 3, 1989

INVENTOR(S) : Masaru TATSUSHIMA et al

It is certified that error appears in the above-identified patent and that said Letters Patent is hereby corrected as shown below:

On the title page, item [30] change the priority data to
    read as follows:

Jul. 14, 1987 [JP]   Japan......... 62-176110
Dec. 26, 1987 [JP]   Japan......... 62-331516
Jun. 09, 1988 [JP]   Japan......... 63-140382

Signed and Sealed this

Twenty-second Day of September, 1992

Attest:

DOUGLAS B. COMER

Attesting Officer          Acting Commissioner of Patents and Trademarks